US010941684B2

(12) United States Patent
Nagai et al.

(10) Patent No.: US 10,941,684 B2
(45) Date of Patent: Mar. 9, 2021

(54) CYLINDER HEAD COVER

(71) Applicant: KUBOTA Corporation, Osaka (JP)

(72) Inventors: Kentaro Nagai, Sakai (JP); Takahiro Yamazaki, Sakai (JP); Reo Yoshida, Sakai (JP); Tomoya Akitomo, Sakai (JP); Shoichi Okimi, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 16/683,394

(22) Filed: Nov. 14, 2019

(65) Prior Publication Data

US 2020/0208551 A1 Jul. 2, 2020

(30) Foreign Application Priority Data

Dec. 31, 2018 (JP) .............................. JP2018-248829

(51) Int. Cl.
*F01M 13/00* (2006.01)
*F02B 75/20* (2006.01)
*F02M 25/06* (2016.01)

(52) U.S. Cl.
CPC ............. *F01M 13/00* (2013.01); *F02B 75/20* (2013.01); *F02M 25/06* (2013.01); *F01M 2013/0038* (2013.01)

(58) Field of Classification Search
CPC ........... F01M 13/00; F01M 2013/0038; F01M 13/0416; F01M 2013/0027; F02B 75/20; F02M 25/06; F02M 35/10222; F02F 7/006
See application file for complete search history.

(56) References Cited

U.S. PATENT DOCUMENTS 3,397,385 A * 8/1968 Moeller ................. G05D 1/044
                                                              340/963
2008/0149065 A1* 6/2008 Brand ................ F01M 13/0416
                                                              123/198 E

FOREIGN PATENT DOCUMENTS

| EP | 2133521 A2 | 12/2009 | |
| FR | 2789125 A1 * | 8/2000 | ......... F01M 13/0416 |
| JP | H09112358 A | 4/1997 | |
| JP | 2002097920 A | 4/2002 | |
| JP | 2012-57575 A | 3/2012 | |
| JP | 2017067021 A | 4/2017 | |
| KR | 100680360 B1 | 2/2007 | |

OTHER PUBLICATIONS

Extended European Search Report dated May 6, 2020 in European Application No. 19206653.8.

* cited by examiner

*Primary Examiner* — Jacob M Amick
*Assistant Examiner* — Charles Brauch
(74) *Attorney, Agent, or Firm* — Panitch Schwarze Belisario & Nadel LLP

(57) ABSTRACT

A cylinder head cover that prevents the gas outlet for the blow-by gas from being cooled by structural improvements so that the gas outlet does not freeze or become clogged in a cold condition. A cylinder head cover includes: a gas passage through which blow-by gas from a crankcase passes; and a gas outlet portion protruding upward from a head cover upper wall. The gas outlet portion includes a protruding case portion bulging upward from the head cover upper wall so as to form an outlet passage through which blow-by gas passes, and an air layer is formed outside the outlet passage in the protruding case portion.

8 Claims, 4 Drawing Sheets

CYLINDER HEAD COVER

CROSS-REFERENCE TO RELATED APPLICATION

This application claims priority under 35 U.S.C. § 119(b) to Japanese Application No. 2018-248829, filed Dec. 31, 2018, the disclosure of which is incorporated by reference herein in its entirety.

BACKGROUND OF THE INVENTION

(1) Field of the Invention

The present invention relates to a cylinder head cover mainly applied to an industrial engine such as a small diesel engine.

(2) Description of Related Art

An industrial diesel engine and the like generally includes a blow-by gas recirculation device having a structure that allows blow-by gas to pass through a cylinder head cover and return to an intake passage.

In such a case, a gas conduit such as a tube or a duct connected to the intake passage is connected to a blow-by gas outlet of the cylinder head cover. In many cases, the gas outlet of the cylinder head cover is formed immediately after a pressure regulating valve such as a positive crankcase ventilation (PCV) valve. For example, a known blow-by gas recirculation device has a structure in which a pressure regulating valve including a cover lid made of a sheet metal is disposed at the top of the cylinder head cover, and the outlet of the pressure regulating valve serves as the gas outlet of the cylinder head cover.

SUMMARY OF THE INVENTION

The technical problems and points to be improved in conventional blow-by gas recirculation devices are as follows. That is, in extremely cold regions, moisture in blow-by gas in an engine is cooled when the engine is stopped, which causes condensation in the engine, and the condensation may freeze in some cases.

In a portion having a surface or wall in contact with the outside air or a portion having a small cross-sectional area, the gas passage may be blocked by freezing. In particular, the gas outlet in the cylinder head cover is likely to have a structure that protrudes upward, so that there is a high risk of overcooling and freezing.

An object of the present invention is to provide an improved cylinder head cover that prevents the gas outlet for the blow-by gas from being cooled by structural improvements so that the gas outlet does not freeze or become clogged in a cold condition.

The present invention provides a cylinder head cover including:

a gas passage through which blow-by gas from a crankcase passes; and a gas outlet portion protruding upward from a head cover upper wall, and the gas outlet portion includes a protruding case portion bulging upward from the head cover upper wall so as to form an outlet passage through which blow-by gas passes, and an air layer is formed outside the outlet passage in the protruding case portion.

For example, it is preferable that the protruding case portion has a standing wall rising from the head cover upper wall, and the air layer is provided between a passage wall for forming the outlet passage and the standing wall. It is more preferable that the standing wall is an inclined wall that rises from the head cover upper wall with an inclination angle such that the protruding case portion has a divergent shape.

In addition, it is preferable that the protruding case portion is configured so that the standing wall faces an upstream side in a flow direction of engine cooling air. It is preferable that the cylinder head cover is for an in-line multiple cylinder industrial diesel engine.

According to the present invention, the air layer is formed outside the outlet passage in the protruding case portion, which significantly improves the heat insulation effect as compared with the case where an air layer is not provided. Therefore, the temperature drop in the outlet passage is suppressed even in a cold condition such as an extremely cold weather, which prevents moisture in blow-by gas from being cooled so as not to cause condensation which sometimes leads to freezing.

As a result, the blow-by gas at the gas outlet portion formed in the protruding case portion is less likely to be cooled due to the structural improvement of providing the air layer at the gas outlet portion, so that an improved cylinder head cover in which the gas outlet does not freeze or become clogged in a cold condition can be provided.

DETAILED DESCRIPTION OF PREFERRED EMBODIMENTS

Hereinafter, an embodiment of a cylinder head cover according to the present invention, in particular a case where the embodiment is applied to a small industrial diesel engine will be described with reference to the drawings.

Figure 3:
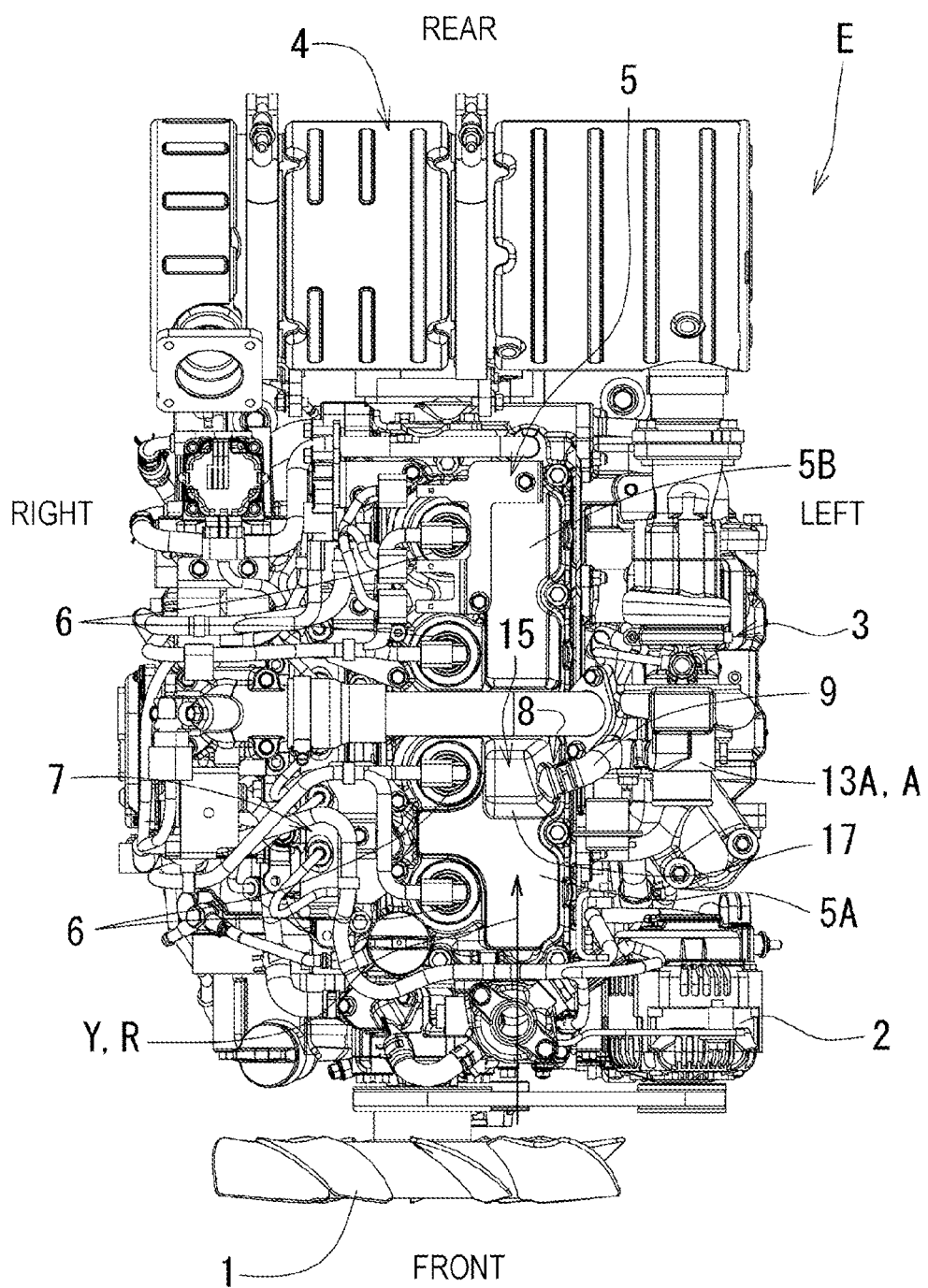
FIG. 3 is a plan view of an industrial diesel engine.

FIG. 3 is a plan view of an industrial diesel engine E, in which the reference sign 1 denotes an engine cooling fan, the reference sign 2 denotes an alternator, the reference sign 3 denotes a supercharger, the reference sign 4 denotes an exhaust treatment device, the reference sign 5 denotes a cylinder head cover (hereinafter shortened as a head cover) assembled to a cylinder head (reference sign omitted), the reference sign 6 denotes a plurality of injectors, and the reference sign 7 denotes a fuel injection supply pump.

This engine E is equipped with a blow-by gas recirculation device (not shown) that allows blow-by gas from a crankcase (not shown) to pass through a gas passage W (see FIG. 1) formed inside the head cover 5, and return to an intake passage A in a state where oil components and the like are removed as much as possible. An example of the intake passage A is an intake duct 3A of the supercharger 3 (see FIG. 4).

Figure 4:
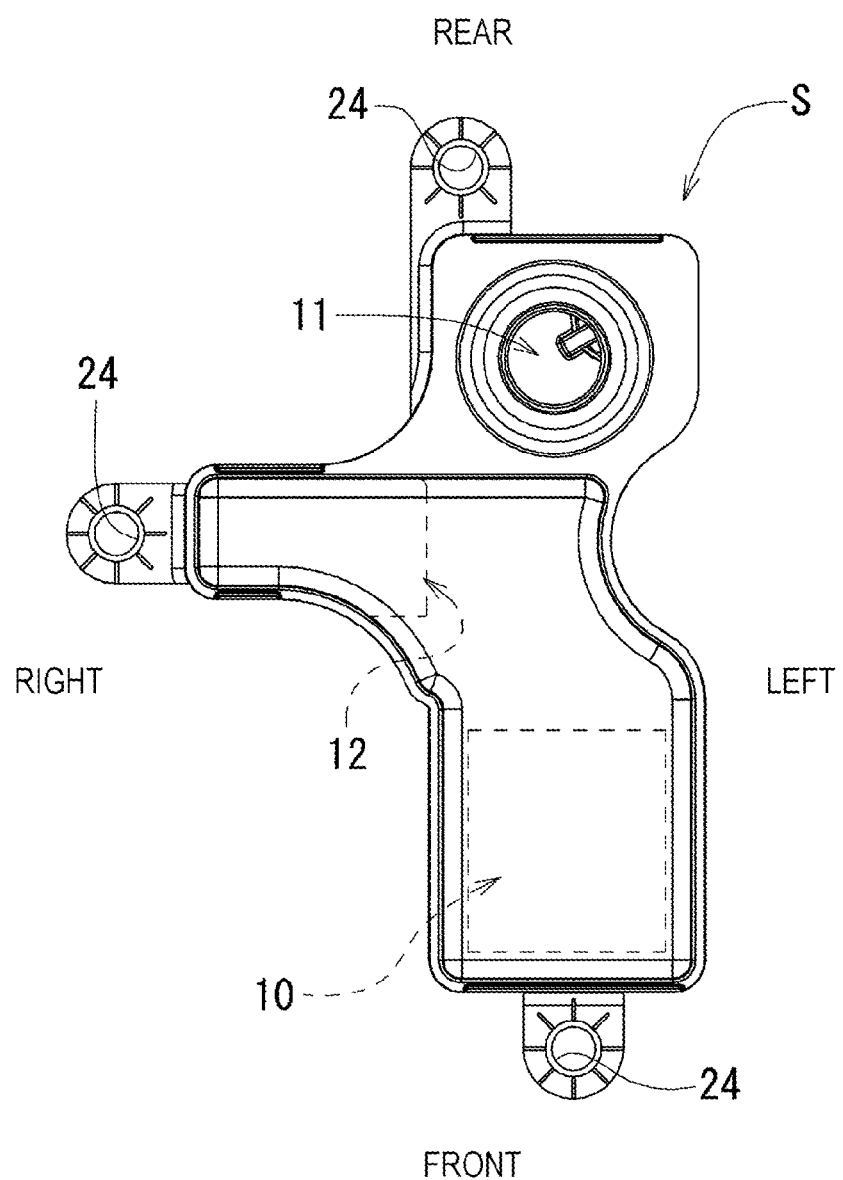
FIG. 4 is a plan view of a separator.

As shown in FIGS. 3 and 4, the head cover 5 is a bottomless box-like member including a vertically intermediate wall 5C having four circular holes 5a for receiving the injectors, a front upper wall (hereinafter referred to as a head cover upper wall) 5A, and a rear upper wall 5B. The rear portion of the head cover upper wall 5A includes a gas outlet portion 8 that protrudes upward from the head cover upper wall 5A. The gas outlet portion 8 which also serves as a breather passage is connected with a gas conduit 9 that allows blow-by gas g to return to the intake passage A.

A separator (oil separator) S shown in FIG. 4 is accommodated under the head cover upper wall 5A. The shape of the separator S in a plan view is formed in a substantially horizontal T-shape according to a shape of an upwardly protruding portion of the head cover upper wall 5A so as to be perfectly fitted inside the head cover upper wall 5A. The front, rear, and right sides of the separator S include insertion holes 24 for attaching the separator S to the inside of the head cover 5 by using bolts.

The separator S has an inlet for blow-by gas, that is, a separator inlet 10 formed at a front end portion of the lower surface thereof, and an outlet for blow-by gas, that is, a separator outlet 11 formed at a rear end portion of the upper surface thereof. The separator S has an oil drop part 12 formed at a front-rear intermediate portion on the right side thereof and protruding greatly downward, and has a filter (not shown) provided between the separator inlet 10 and the oil drop part 12 in the front-rear direction.

Accordingly, the blow-by gas g from the crankcase enters the inside of the separator S from the front end portion inside the head cover 5 through the separator inlet 10 at the front end portion of the lower surface of the separator S, and flows out through the separator outlet 11 at the rear end portion of the upper surface of the separator S after being subjected to a filter effect and an oil dripping effect.

Figure 1A:
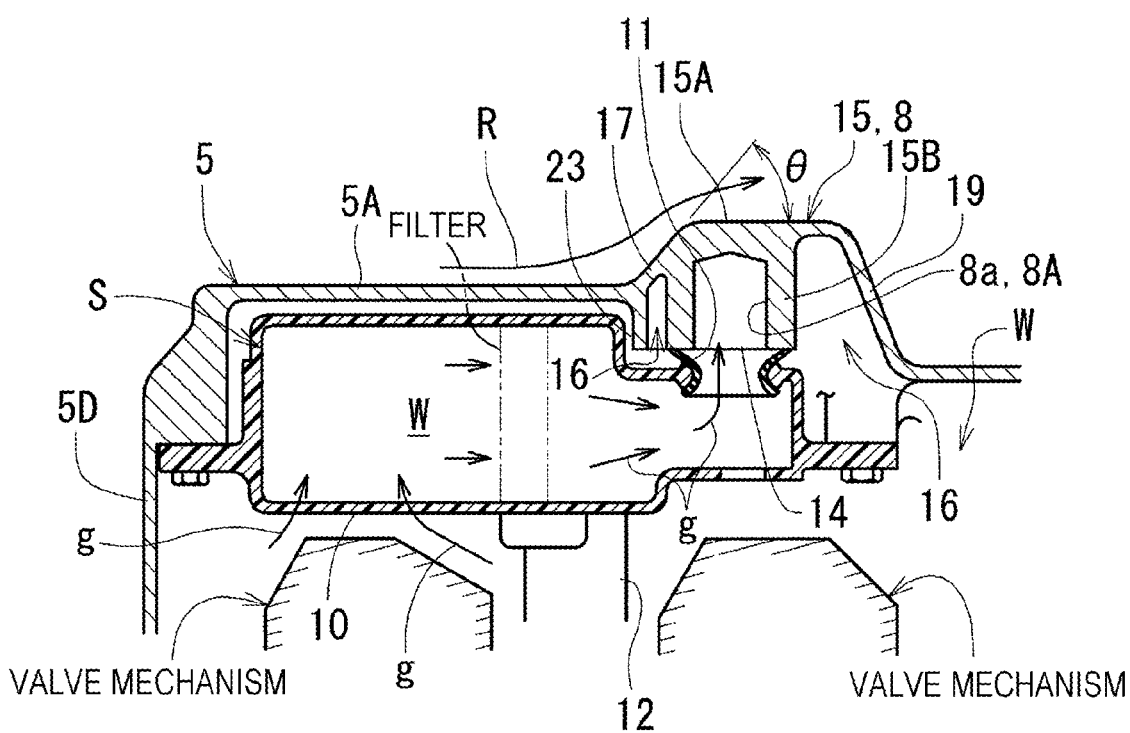
FIG. 1A is a vertical sectional view of a front part of a head cover taken at a gas inlet opening.

As shown in FIG. 1A, the separator outlet 11 is disposed to face a gas inlet opening 14 of the gas outlet portion 8 of the head cover 5 in an airtight manner. Accordingly, the blow-by gas g discharged from the separator outlet 11 passes through the gas outlet portion 8 and then flows into the gas conduit 9. That is, the gas passage W inside the head cover 5 is also formed inside the separator S accommodated therein.

Figure 2:
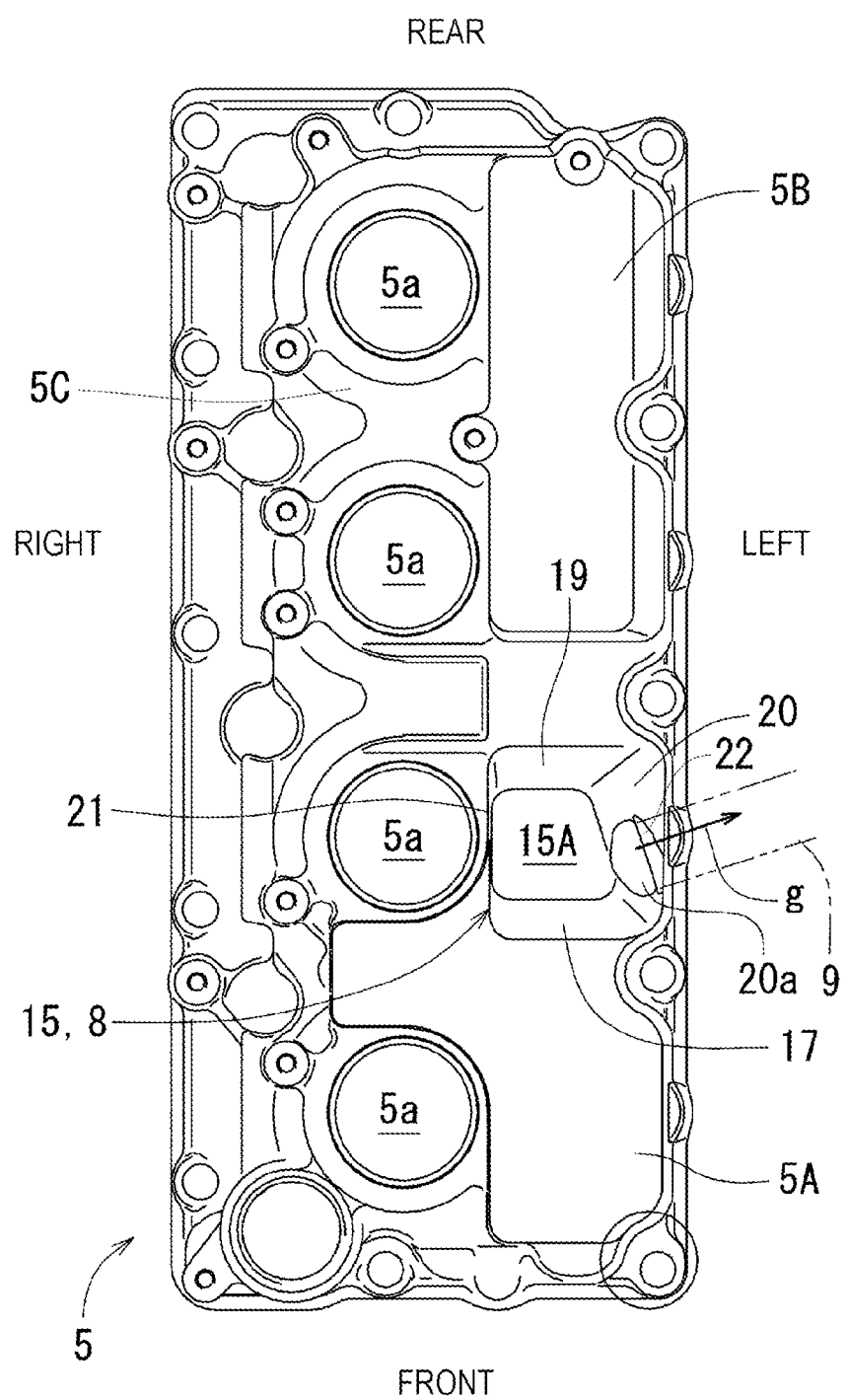
FIG. 2 is a plan view of a single head cover.

As shown in FIGS. 1A, 2, and 3, the gas outlet portion 8 includes a protruding case portion 15 bulging upward from the head cover upper wall 5A so as to form an outlet passage 8A through which the blow-by gas g passes, and an air layer 16 is formed outside the outlet passage 8A in the protruding case portion 15. In FIG. 1A, the reference sign 5D denotes a head cover front wall.

The protruding case portion 15 includes a top wall 15A, a front standing wall 17, a rear wall 19, an extraction wall 20 provided on the left side thereof, and a right-side wall 21 provided on the right side thereof. The standing wall 17, the rear wall 19, and the extraction wall 20 are formed as inclined walls with an inclination angle, and the protruding case portion 15 has a divergent appearance. The extraction wall 20 having an outer surface (reference sign omitted) facing slightly left rearward includes an eaves wall 20a with an outlet opening 22 of the outlet passage 8A.

Figure 1B:
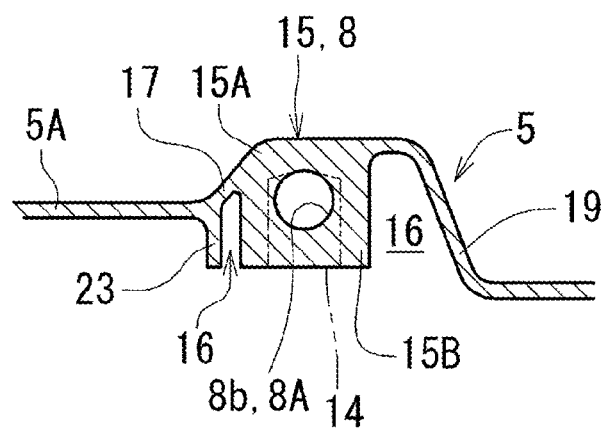
FIG. 1B is a vertical sectional view of a gas outlet portion taken at a portion slightly left of the gas inlet opening.

The protruding case portion 15 includes a passage wall 15B that protrudes downward into the inside of the head cover 5, and the passage wall 15B includes the outlet passage 8A having an inversed L-shape in a side view. The outlet passage 8A is formed as a bent passage including a vertical passage portion 8a having the gas inlet opening 14 at the lower end thereof and a lateral passage portion 8b having the outlet opening 22 at the left end (tip end) thereof. As shown in FIGS. 1A and 1B, a rib wall 23 is formed on the back side of the lower end portion of the standing wall 17 so as to protrude downward within a range that does not interfere with the separator S.

Therefore, as shown in FIGS. 1A and 1B, the air layer 16 is formed in a state straddled by the standing wall 17 rising from the head cover upper wall 5A at the inclination angle θ, the passage wall 15B, and the rib wall 23. The air layer 16 is also formed between the rear wall 19 and the passage wall 15B. Further, as shown in FIG. 3, the protruding case portion 15 is configured so that the standing wall 17 faces the upstream side in the flow direction of the engine cooling air R (the direction of the arrow Y).

The following effects can be obtained by the head cover configured as described above. The air layer 16 is formed around the passage wall 15B protruding downward from the gas outlet portion 8 projecting from the head cover upper wall 5A as a breather path of the head cover 5, and is sandwiched between the passage wall 15B and the standing wall 17 that is an outer wall of the head cover 5. The standing wall 17 is an inclined wall with an angle from the horizontal.

In other words, while the conventional product has a single wall structure, the present invention has a double wall structure (passage wall 15B, standing wall 17) provided with the air layer 16 therebetween, so that a heat insulation effect is significantly improved. Therefore, the temperature drop in the outlet passage 8A is suppressed even in a cold condition such as an extremely cold weather, which prevents moisture in blow-by gas from being cooled so as not to cause condensation which sometimes leads to freezing.

Further, the protruding case portion 15 is positioned downstream of the engine cooling air R from the engine cooling fan 1, and the standing wall 17 is directly exposed to the engine cooling air R. However, since the standing wall 17 is an inclined wall with an inclination angle θ, the engine cooling air R smoothly blows along the standing wall 17 as indicated by the arrow in FIG. 1A, which can minimize or greatly suppress cooling effect by the engine cooling air R.

As a result, the blow-by gas g at the gas outlet portion 8 formed in the protruding case portion 15 is less likely to be cooled due to the structural improvement, so that an improved cylinder head cover 5 in which the gas outlet does not freeze or become clogged in a cold condition can be provided.

Another Embodiment

The right-side wall 21 may also be an inclined wall so that the air layer 16 is formed between the right-side wall 21 and the passage wall 15B.

What is claimed is:

1. A cylinder head cover comprising:
   a gas passage through which blow-by gas from a crankcase passes; and
   a gas outlet portion protruding upward from a head cover upper wall,
   wherein the gas outlet portion includes a protruding case portion bulging upward from the head cover upper wall so as to form an outlet passage through which blow-by gas passes,
   a passage wall protruding downward from the protruding case portion includes the outlet passage having an inversed L-shape in a side view, the outlet passage having a vertical passage portion having a gas inlet opening at a lower end thereof and a lateral passage portion having an outlet opening at a tip end thereof, and
   wherein an air layer is formed between the passage wall and the protruding case portion, a lower part of the air layer communicating with an inside of the head cover.

2. The cylinder head cover according to claim 1, wherein the protruding case portion has a standing wall rising from the head cover upper wall, and the air layer is provided between the passage wall for forming the outlet passage and the standing wall.

3. The cylinder head cover according to claim 2, wherein the standing wall is an inclined wall that rises from the head cover upper wall with an inclination angle such that the protruding case portion has a divergent shape.

4. The cylinder head cover according to claim 3, wherein the protruding case portion is configured so that the standing wall faces an upstream side in a flow direction of engine cooling air.

5. The cylinder head cover according to claim 1, wherein the cylinder head cover is for an in-line multiple cylinder industrial diesel engine.

6. The cylinder head cover according to claim 2, wherein the cylinder head cover is for an in-line multiple cylinder industrial diesel engine.

7. The cylinder head cover according to claim 3, wherein the cylinder head cover is for an in-line multiple cylinder industrial diesel engine.

8. The cylinder head cover according to claim 4, wherein the cylinder head cover is for an in-line multiple cylinder industrial diesel engine.

\* \* \* \* \*